US005124876A

United States Patent [19]

Misencik et al.

[11] Patent Number: 5,124,876

[45] Date of Patent: Jun. 23, 1992

[54] MULTIPLE OUTLET RECEPTACLE WITH SURGE SUPPRESSION

[75] Inventors: John J. Misencik, Shelton; Russell T. Borona, Seymour, both of Conn.

[73] Assignee: Hubbell Incorporated, Orange, Conn.

[21] Appl. No.: 495,787

[22] Filed: Mar. 22, 1990

[51] Int. Cl.$^5$ ........................ H02H 1/06; H02B 1/056; H01R 4/66

[52] U.S. Cl. .................................... 361/117; 361/118; 361/127; 361/357; 439/106; 439/490; 439/539

[58] Field of Search .................. 361/117, 56, 91, 111, 361/126, 127, 356, 118, 357; 439/538, 539, 620, 621, 622, 490, 106

[56] References Cited

U.S. PATENT DOCUMENTS

| | | | |
|---|---|---|---|
| 3,924,914 | 12/1975 | Banner | 439/490 |
| 4,398,236 | 8/1983 | Campisi et al. | 361/419 |
| 4,583,799 | 4/1986 | Wiley . | |
| 4,659,161 | 4/1987 | Holcomb | 439/490 |
| 4,872,081 | 10/1990 | Murphy et al. . | |
| 4,912,590 | 3/1990 | Misencik et al. | 361/56 |
| 4,978,318 | 12/1990 | Wiley et al. | 439/536 |
| 5,010,438 | 4/1991 | Brady | 361/56 |

OTHER PUBLICATIONS

Electrical Ideas, Wiremold, Jan. 1990, advertisement pp. 1-4, Electrical Construction and Maintenance Magazine.

*Primary Examiner*—Steven L. Stephan
*Assistant Examiner*—Ben Davidson
*Attorney, Agent, or Firm*—Jerry M. Presson; Alfred E. Goodman

[57] ABSTRACT

A multiple outlet receptacle, such as one having four outlets in respective quadrants, is provided with a surge suppression circuit including a metal oxide varistor edgewise between the front and back of the device, other electronic elements, including dual status indicators, connected with an outer ring like contact plate and secured within portions of the insulating housings. Features for compactness and ease of assembly are provided. A pilot light indicator may alternatively be provided in receptacles without a surge suppressor utilizing some of the same components and assembly features.

13 Claims, 5 Drawing Sheets

MULTIPLE OUTLET RECEPTACLE WITH SURGE SUPPRESSION

BACKGROUND AND SUMMARY OF THE INVENTION

This invention relates to electrical wiring devices, and particularly to receptacles having four outlets and incorporating a surge suppression circuit that protects each of the outlets.

Wiley U.S. Pat. No. 4,583,799, Apr. 22, 1986, discloses an example of a multiple (four) outlet receptacle of a type to be improved by the present invention to incorporate, in addition to the otherwise present elements, a surge suppression circuit. The receptacle as earlier disclosed comprises a relatively shallow insulating housing with contacts for four outlets arranged in respective quadrants of the housing and is designed for mounting on a surface flush with the back of the housing. The earlier device has been further improved and also provided with additional mounting accessories, such as disclosed in copending application Ser. No. 340,198, filed Apr. 19, 1989 by Wiley et al., and assigned to the assignee of the present invention. The receptacle has proven very satisfactory and has enjoyed considerable success. It provides four outlets in a neat and trim configuration. Since angle plugs may be used which have their cords leading in four different orthogonally related directions, cord confusion and the unattractiveness of a jumble of cords is minimized.

It is now a desire to improve upon the former design by incorporating within such receptacle, without basically altering its neat and trim appearance, a surge suppression circuit so that each of the outlets is protected against voltage surges which could endanger equipment connected to them. One suitable surge suppression circuit is that disclosed in copending application Ser. No. 345,929, May 1, 1989 by Misencik et al. which offers advantages because of features that allow the elements of the circuit to be compactly arranged. By the present invention, a multiple (at least three, preferably four as will be described) outlet receptacle is provided with a molded insulating housing suitable for mounting to a surface and having contact elements therein, the housing front face having plug blade receiving apertures for each of the four outlets arranged in respective quadrants of the front face and the housing having a back surface with wire terminals and with a surge suppression circuit including at least one surge suppressor such as a metal oxide varistor connected with the internal contact elements and located within the same housing among and between the various contact elements. In a specific embodiment of the invention, the surge suppressor is a substantially disk shaped element that is physically arranged substantially on edge between the front and back faces of the housing and, further, with the back face having a bowed-out portion to accommodate part of the varistor. The bowed-out portion, in one embodiment, extends outwardly from the major portion of the back face no more than about the same extent as the raised ribs that locate the ground plate. As with the prior disclosed receptacle, a specific embodiment of the invention may have the contact elements attached to respective conductive plates of which one is an apertured ring and the other is disposed therein; the centrally located conductive plate has an opening through which the varistor extends. The opening in the conductive plate and the bowed-out portion of the back plate allow use of a larger varistor than would otherwise be feasible while keeping to the shallow dimensions of the receptacle as are desired. Other elements of the surge suppression circuit, in the specific embodiment, include a fuse and various resistors that are physically associated with the ring-like conductive plate. Another feature of the surge suppression unit is to have one or more indicating elements for indicating the condition of the surge suppression circuit which are visible from the front surface such as by first and second light emitting devices indicating respectively that power is on and surge suppression is lost or that power is on and surge suppression is present. These are conveniently arranged for high readability at substantially opposite extremes of the housing front face.

The invention can also be applied to equip a receptacle of the type described with status indication even without surge suppression. That is, an indicating element can be connected as a pilot light between the contact plates for indication of power being present.

Other features of the invention will be subsequently described herein and will make apparent to those skilled in the art alternative arrangements consistent with the more general aspects of the present invention.

THE DRAWING

PREFERRED EMBODIMENTS

Reference is made to the before-mentioned Wiley patent and Wiley et al. application to incorporate herein their description of the structure of four outlet receptacles that serve as examples of receptacles to which the present invention may be applied, among others. Furthermore, reference is made to the above-mentioned Misencik et al. patent application to incorporate herein its description of surge suppression circuits that serve as examples of circuits that may be incorporated within receptacles in accordance with the present invention, in addition to other suitable circuits.

Figure 1:
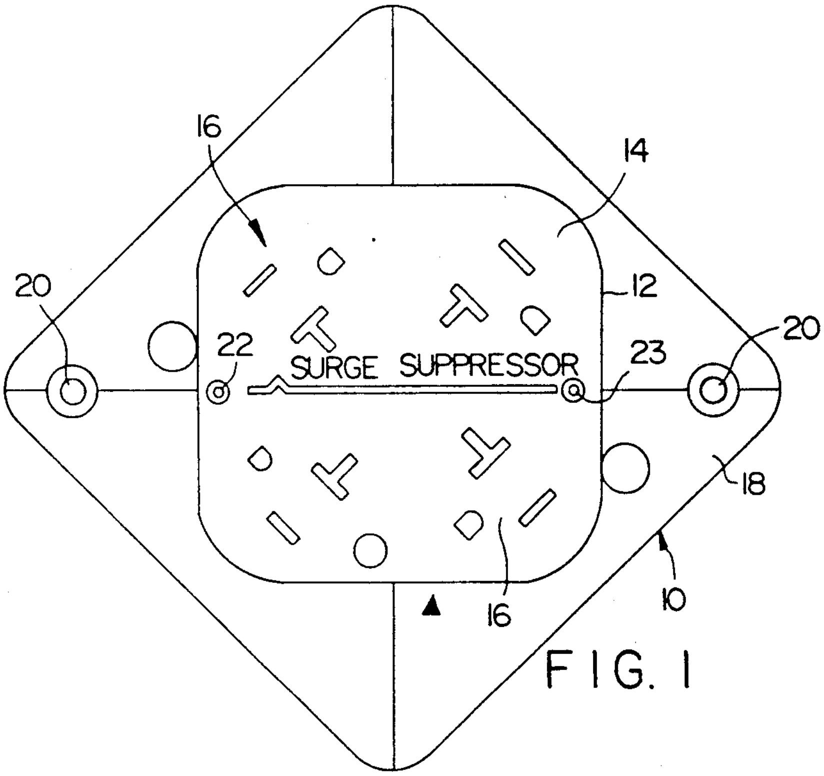
FIG. 1 is a front view of a receptacle in accordance with an embodiment of the present invention.
Figure 2:
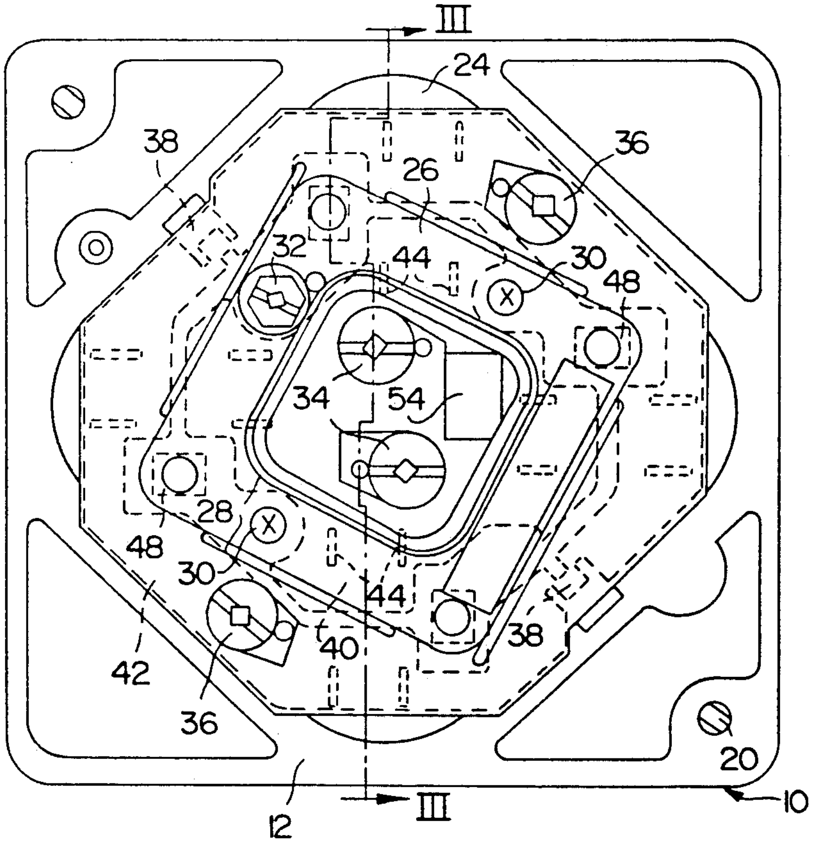
FIG. 2 is a rear view of an embodiment of the invention.

Referring to the drawing, FIGS. 1 and 2 give assembled front and rear views of an example of a receptacle 10 in accordance with the present invention. The wiring device or receptacle is a multiple outlet receptacle particularly having four outlets in a housing 12 of molded insulating material adapted for permanent installation, such as by surface mounting or otherwise generally consistent with the above-referred to patent and application.

As will become more apparent hereinafter, such as with reference to FIG. 3, the receptacle 10 has a shallow depth from front to back that is desirable to achieve a good appearance but restricts the available internal volume of the housing 12.

The housing 12 has a front face 14 in which the plug apertures for the outlets appear; a set of apertures 16 is provided for each of the four outlets. The front face 14 in this example has an overall configuration that is substantially rectangular with rounded corners and has extending from the contact housing 12 a mounting flange 18 integrally molded with the housing. The mounting flange 18 has a substantially rectangular configuration with rounded corners oriented with its corners midway between corners of the housing. Other configurations for the wiring device, with or without a distinct mounting flange, are suitable for use in the practice of the invention. In one form, the device 10 is mountable by itself in certain configurations on a surface, such as by use of fasteners through apertures 20 in the flange 18 that align with mounting locations of an outlet box. Other suitable forms of mounting the device include the use of accessories in accordance with the Wiley et al. copending application.

The front view of FIG. 1 also shows indicia that the receptacle 10 is equipped with a surge suppressor and with isolated ground and also has dual indicators, one of which 22 provides a green light indicating the power is on and the device protected, and the other 23 provides a red light indicating the power is on and the surge suppressor is defective, in accordance with the above-mentioned Misencik et al. copending application. As shown, the indicators 22 and 23 are located substantially diametrically opposite each other on the front face 14 of the contact housing.

In FIG. 2, an insulating back cover 24 is shown that fits within an opening of the main housing portion 12 and when assembled provides a substantially flush surface. A ground plate 26 is located on the exterior of the back cover within locator ribs 28 of raised insulating material. Fasteners 30 extend through the ground plate 26 and the back cover 24 into the interior of the device which has fastener bosses within housing 12 receptive of such fasteners. The ground plate 26 has a screw terminal 32 for a ground wire connection.

Additionally, the back cover 24 has openings accessing terminal screws 34 and 36 for connection to the internal power contacts. Access is also provided to break-off tabs 38 that allow the device to be used as two separate pairs of receptacles on separate circuits. The internal power contacts of the device are attached to contact plates that include a central plate 40 with a power contact for each of the four outlets and a peripherally surrounding ring plate 42 with an additional power contact for each of the four outlets, the ring plate having the optional break-off tabs 38. The assembled back view, FIG. 2, shows the plates 40 and 42 in outline and also shows in outline the staked joints of the several contacts to the respective plates. These include center plate contacts 44, outer ring plate contacts 46. Also, ground contacts 48 are riveted to ground plate 26; also see FIG. 3. Each of a contact 44, 46 and 48 occur within each of the four outlets accessed by a set of the apertures 16 in the front face.

Figure 3:
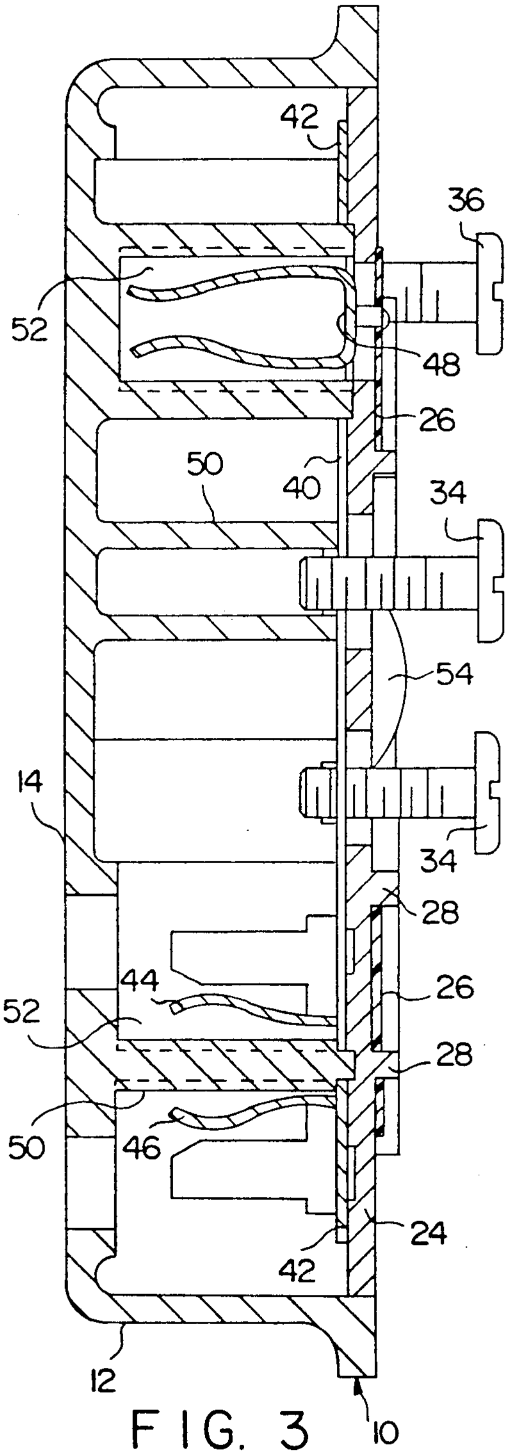
FIG. 3 is a sectional view taken along the line III—III of FIG. 2.

The sectional view of FIG. 3 shows the contact plates 40 and 42 in substantially coplanar arrangement disposed on insulating walls 50 of the housing 12 with compartments 52 therebetween that accommodate contacts and provide a degree of extra electrical isolation therebetween. FIG. 3 also illustrates the ground plate 26 on the exterior of the back cover 24 with the ribs 28 that serve to locate the ground plate. The contact elements are attached to the respective contact plates by staking in the case of the power contacts and, in this example, by a rivet in the case of the ground contacts.

FIGS. 2 and 3 also show a bulge or bowed-out portion 54 of the back cover or back face 24 of the device. This is so the device 10 can be easily provided with a surge suppression circuit whereby a metal oxide varistor can be stood substantially on edge between the front and back faces and, even though the device housing space is quite shallow, can still be accommodated, helped by the additional space afforded by the bowed-out portion. As shown, the bowed-out portion 54 extends substantially only to the plane of the extremities of the ribs 28 that help locate the ground plate and thus the bowed-out portion does not to any appreciable degree enlarge the depth dimension of the overall device.

Figure 4:
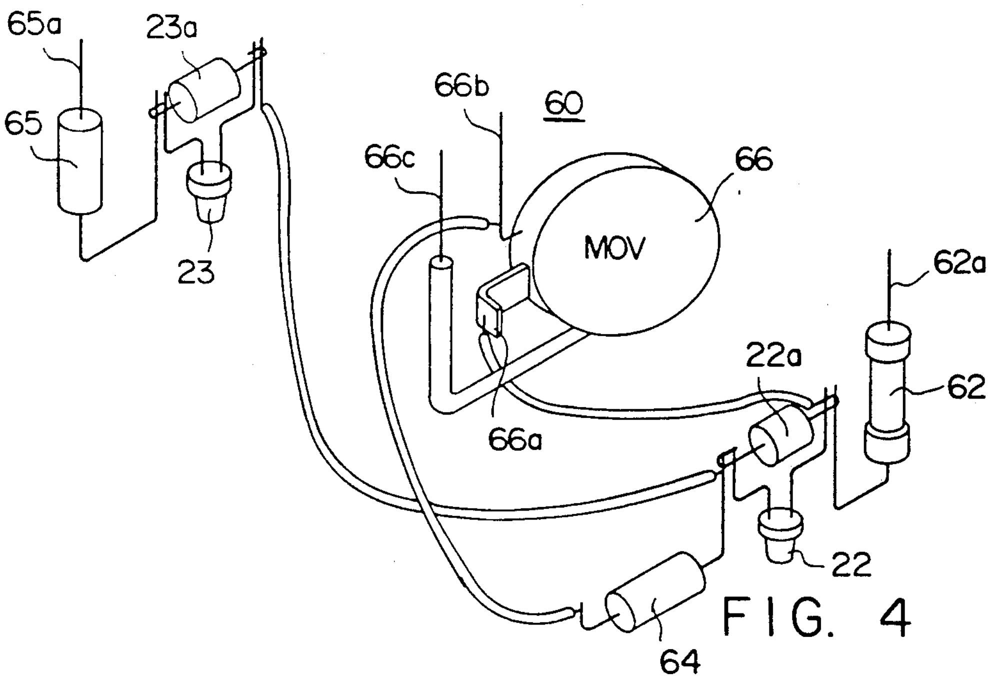
FIG. 4 is a perspective view of electronics incorporated in an embodiment of the invention.
Figure 5:
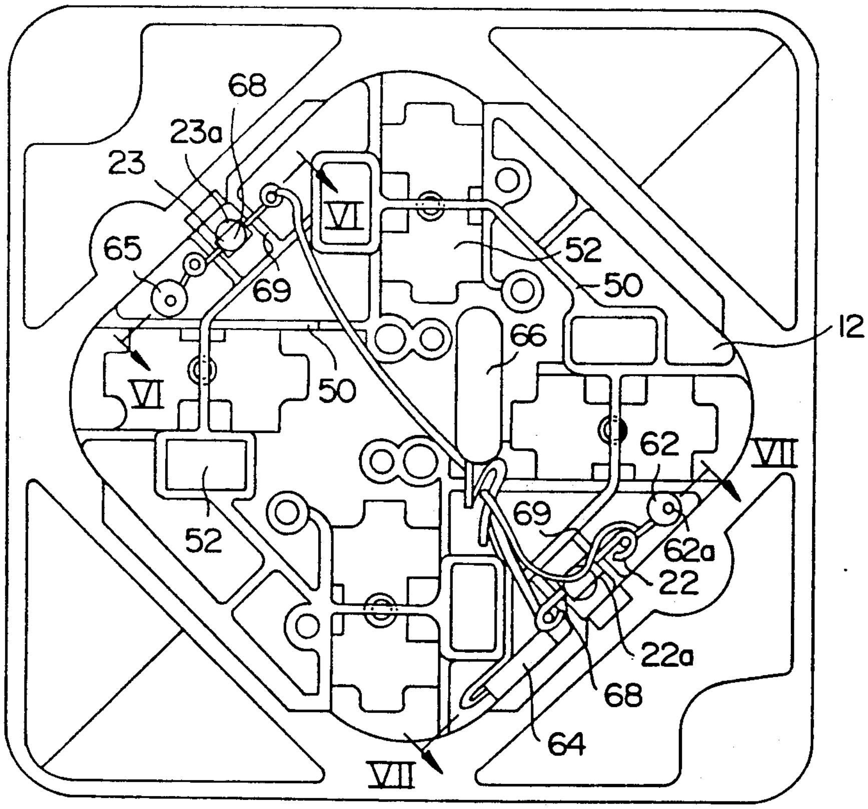
FIG. 5 is a plan view, from the rear, of an embodiment of the invention with certain elements omitted to show the location of electronics therein.

Referring to FIG. 4, the elements of a surge suppression circuit 60 in accordance with a specific embodiment are shown substantially in the geometrical relationship in which they are located in the housing 12. FIG. 5 shows the housing 12 with the contact plates 40, 42 and 26 and back cover 24 absent and the electronics 60 in place.

Figure 10:
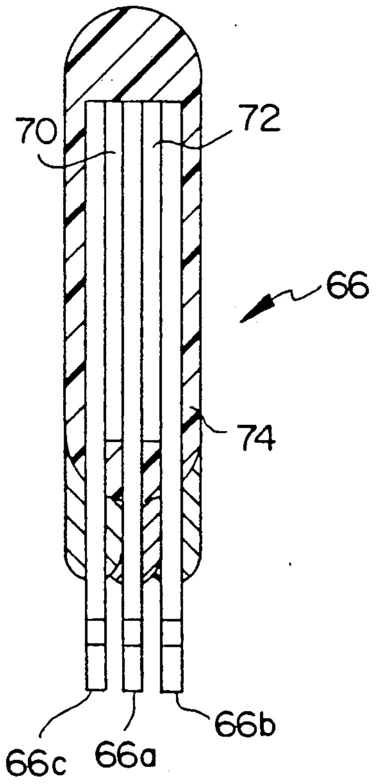
FIG. 10 is a cross-sectional view of the pair of varistor disks in accordance with an embodiment of the invention.

The circuit of FIG. 4 is consistent with that of the copending Misencik et al. application and will not be described in detail herein except by identifying various components which include a fuse element 62 which is located in an essentially upright or vertical manner between the front and back faces of the device with a lead 62*a* that is soldered to the ring contact plate 42. The dual indicators 22 and 23 are respective green and red light emitting diodes with associated parallel auxiliary diodes 22*a* and 23*a* further connected with first and second resistors 64 and 65 of which, in this example, resistor 64 is located in a horizontal position relative to the front face 14 of the device and resistor 65 is in a vertical position relative to the front face. Between the indicators 22 and 23 and the aforementioned electronic components is a metal oxide varistor 66 which in the embodiment as show in FIG. 10 is one that comprises two varistor disks 70 and 72 within a common covering of insulating material 74 and having external leads 66*b* and 66*c* from the outer surfaces of the pair of disks and a center tap lead 66*a* from the intermediate surfaces of the disk, in accordance with the copending Misencik et al. application.

Figure 6:
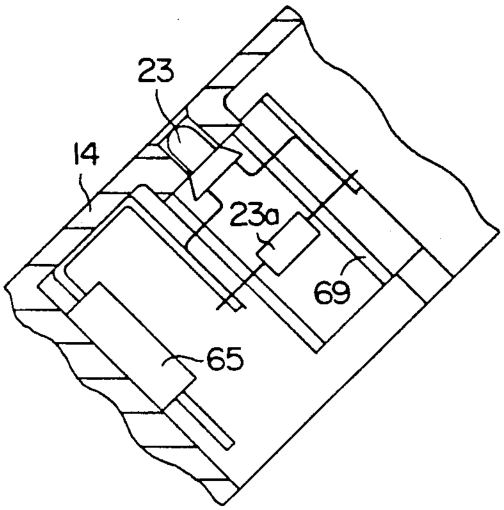
FIG. 6 is a partial sectional view taken along line VI—VI of FIG. 5.

Ease of assembly is provided by the manner in which the components are arranged. FIG. 6 shows a partial sectional view with the assembled red LED 23 and its immediately associated resistor 65. The LED 23 is inserted within an aperture of the front face 14 of the housing and has a collar that abuts against the interior of the front face and may simply be glued in place or, alternatively, held in place by an insulating (e.g. fiber) spacer wedged. The auxiliary diode 23*a* has leads that are held in place by wedging them into slots 68 of a pair of the walls 69 of the housing internal structure. Slots 68 also may secure a spacer holding LED 23 in place (not shown).

Figure 7:
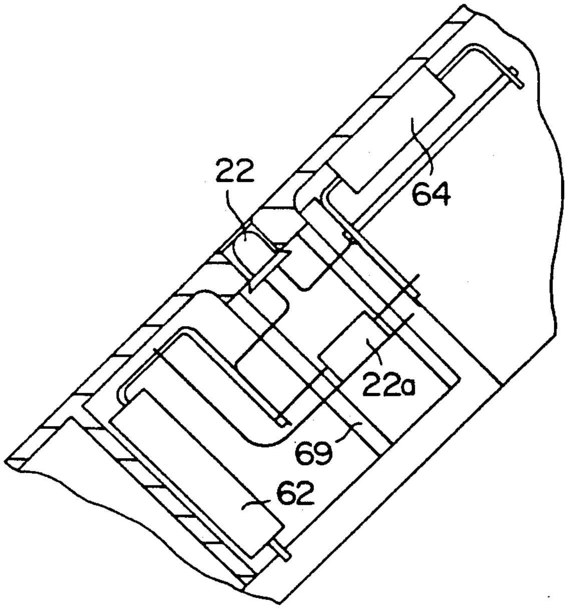
FIG. 7 is a partial sectional view taken along line VII—VII of FIG. 5.

FIG. 7 shows a similar partial sectional view of the portion of the structure with the green LED 22 and its immediately associated resistor 64 and the fuse element 62. Auxiliary diode 22*a* is similarly held in place by its leads fitting into slots 68 of walls 69.

Figure 8:
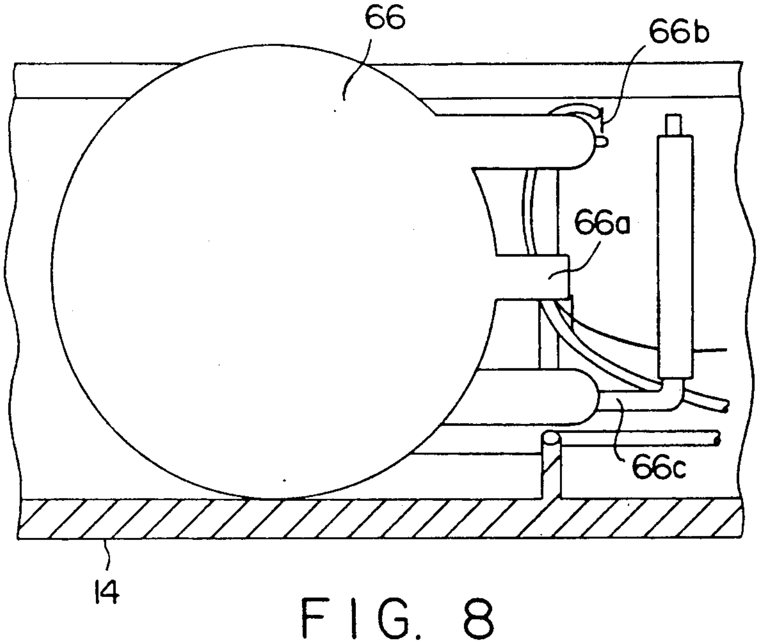
FIG. 8 is a partial sectional view taken along line VIII—VIII of FIG. 5.

FIG. 8 shows a partial sectional view illustrating the orientation of the metal oxide varistor package 66 within the structure, substantially on edge or perpendicular to the front face 14. This view also shows more clearly the orientation of three leads 66*a* of varistor 66.

Figure 9:
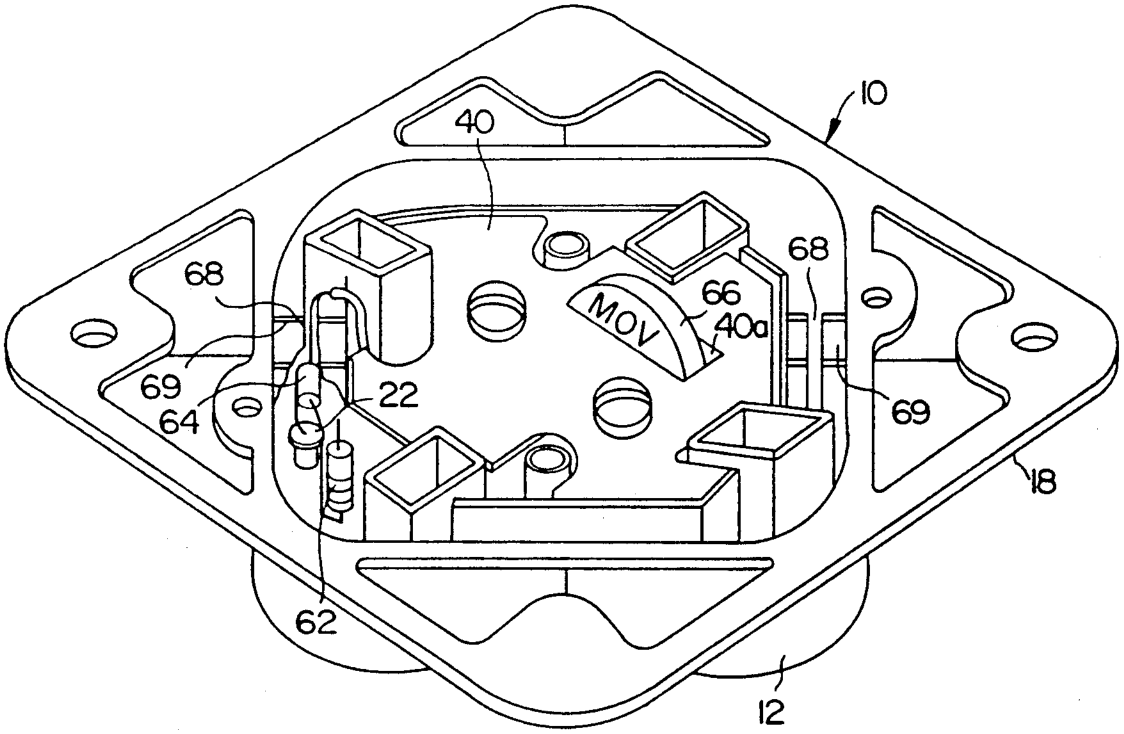
FIG. 9 is a perspective view, generally from the rear, of an embodiment of the invention with certain elements omitted.

Referring to the perspective view of FIG. 9, the device is shown with the back cover and the apertured ring plate absent but with the center plate 40 in place which illustrates the fuse 62 LED 22 and resistor 64 at one side of the center plate within compartments of the housing; slots for mounting the additional indicator and its related components at the other side of the housing are shown with those components absent. Furthermore, the view of FIG. 9 shows the MOV 66 extending through an aperture 40*a* of the center plate 40. Without such an aperture the space available in front of the center plate would highly restrict the size and orientation of a metal oxide varistor for use in the surge suppression circuit 60. However, with the apertured center plate, plus the use of the bowed-out portion 54 of the back cover, considerable flexibility is allowed in choice of varistor. It is particularly favorable to utilize the unitary package of a pair of disks with three leads, as in the aforementioned Misencik et al. application, to further economize on space necessary to be used within the device.

Among the highly desirable aspects of the present invention is that it is convenient to assemble, as well as compact. The assembly procedure, by way of example, is as follows:

(a) contact plates 26, 40 and 42 are individually subassembled with their respective contacts and screw terminals;

(b) the red LED 23, diode 23*a* and resistor 65 are wired together and then placed within the housing 12 with one lead 65*a* of resistor 65 extending straight up (see FIG. 4);

(c) the green LED 22, diode 22*a*, resistor 64 and fuse 62 are wired together and also a lead of resistor 64 is wired to one terminal 66*a* of MOV 66 and elements 22, 22*a*, 64, 62 and 66 are all placed in the housing with a lead 62*a* from fuse 62 and two leads 66*b* and 66*c* from MOV 66 extend straight up, as in FIG. 4;

(d) a conductor 67 is connected as shown in FIG. 4 between the red and green LED's 23 and 22;

(e) ring plate 42 is put in place by locating two small apertures in it onto the leads 62*a* and 65*a* which are then soldered to it;

(f) inner plate 40 is put in place and has holes for leads 66*b* and 66*c*, one of which is then soldered to it;

(g) back cover 24 is then put in place, with the remaining MOV lead 66*b* or 66*c* extending through it;

(h) ground contact plate 26 is placed on the back cover, secured together by fasteners 30, and the MOV lead is soldered to it.

It is therefore seen in accordance with the present invention that an arrangement is provided that efficiently uses available space to equip a multiple outlet receptacle with a surge suppressor.

One can obtain the functions of a pilot light using an indicator element such as LED 23, along with diode 23*a* and current limiting resistor 65, without being in circuit with an MOV or fuse. Those elements, located as shown and described herein, can be connected between the contact plates 40 and 42 so such an LED, of whatever color may be chosen, will indicate when power is on. Because the outer plate 42 can be separated to provide two outlets on each of two circuits, two such pilot light indicators can be provided with components substantially as shown and described absent the MOV and fuse. The design provides flexibility and economy in manufacture because of the ease of turning out desired quantities of receptacles including receptacles without status indication or surge suppression, those with a pilot light, or those with surge suppression and status indication since a number of design features are common.

We claim:

1. A multiple outlet receptacle with surge suppression comprising:

a molded insulation housing for permanent installation, said housing having a front face with plug blade receiving apertures for each of more than two outlets arranged in respective areas of said front face, said housing having a back face with wire terminals, said back face further provided with a bowed-out portion;

a plurality of contact elements disposed in said housing, said contact elements including a first group of contact elements attached to a first conductive plate configured as an apertured ring and a second group of contact elements attached to a second conductive plate that is coplanar with said first conductive plate and that is disposed within said aperture of said first conductive plate, said second conductive plate having at least one opening; and a surge suppression circuit including at least one surge suppressor connected to said contact elements and located within said housing, said surge suppressor including a substantially disk shaped metal oxide varistor physically arranged substantially on edge between said front and back faces of said housing;

said varistor extending through said opening in said second conductive plate and extending into said bowed-out portion of said back face.

2. A receptacle in accordance with claim 1 wherein: said surge suppression circuit further includes at least one condition indicator visible on said front face.

3. A receptacle in accordance with claim 2 wherein: said at least one condition indicator comprises a first light emitting device which when lit indicated power to the receptacle is on and surge suppression is lost and a second light emitting device which when lit indicates power to the receptacle is on and surge suppression is present.

4. A receptacle in accordance with claim 3 wherein: said first and second light emitting devices are located at substantially opposite extremes of said housing front face.

5. A receptacle in accordance with claim 4 wherein: said surge suppression circuit includes a fuse and resistors located proximate said first conductive plate.

6. A receptacle in accordance with claim 5 wherein: a receptacle further includes a ring-shaped ground plate exterior of said back face substantially opposite said second conductive plate in the housing interior; and said surge suppressor has a first connection directly connected to said ground plate and a second connection directly connected to said second conductive plate.

7. A receptacle in accordance with claim 6 wherein:

said surge suppressor includes a pair of disk shaped metal oxide varistor elements in close parallel relation within an insulating covering from which an outer lead extends respectively from one outer surface of each of said pair of elements and a center tap lead from between said pair of elements, said outer lead from one varistor element being connected to said ground plate and said outer lead from the other varistor element being connected to said second conductive plate.

8. A receptacle in accordance with claim 7 and further comprising:

a connection from said center tap lead to a first side of said fuse and a connection from a second side of said fuse to said first conductive plate to provide surge suppression between each pair of a wire distribution system.

9. A receptacle in accordance with claim 6 wherein said housing includes a rib extending outwardly from said back face a distance substantially the same as the distance said bowed-out portion extends from said back face, said ground plate being positioned by said rib.

10. An outlet receptacle having at least four outlets accessible by plug blade apertures with surge suppression means comprising:

a molded insulation housing for permanent installation and having a plurality of contact elements therein, said housing having a front face with plug blade receiving apertures for said outlets arranged in respective areas of said front face, said housing having a back face with wire terminals;

said contact elements including a first group of contact elements attached to a first conductive plate configured as an apertured ring and a second group of contact elements attached to a second conductive plate that is disposed within said aperture of said first conductive plate and coplanar therewith, said second conductive plate having at least one opening therein; and at least one viewable indicator associated with surge suppression components, said indicator being viewable through said front face of said housing, said indicator and surge suppression components being positioned within the outer periphery of said first plate, and at least one surge suppression component extending through said opening in said second conductive plate from said front face to said back face, said indicator indicating a status of said surge suppression circuit when energized.

11. A receptacle in accordance with claim 10 wherein said viewable indicator includes two spaced-apart indicator lights.

12. A receptacle in accordance with claim 10 and further comprising a bowed-out portion in said back face, at least one of said surge suppression components extending from said front face through said opening in said second conductive plate into said bowed-out portion.

13. A receptacle in accordance with claim 10 wherein:

the viewable indicator is electrically connected between said contact plates for contact elements of the outlets and when energized indicates power is on to the contact plates.

* * * * *